(12) United States Patent
Heger

(10) Patent No.: US 6,922,063 B2
(45) Date of Patent: Jul. 26, 2005

(54) APPARATUS AND METHOD FOR CAPACITIVE LEVEL SENSOR

(75) Inventor: Charles E. Heger, Saratoga, CA (US)

(73) Assignee: Zircon Corporation, Campbell, CA (US)

(*) Notice: Subject to any disclaimer, the term of this patent is extended or adjusted under 35 U.S.C. 154(b) by 0 days.

(21) Appl. No.: 10/618,403

(22) Filed: Jul. 11, 2003

(65) Prior Publication Data

US 2005/0007125 A1 Jan. 13, 2005

(51) Int. Cl.[7] .............................................. G01R 27/26
(52) U.S. Cl. ........................ 324/658; 324/660; 33/291
(58) Field of Search ................................ 324/658–662; 33/365, 366.11, 12, 366.13, 14, 366.15, 291; 356/149

(56) References Cited

U.S. PATENT DOCUMENTS

| | | | |
|---|---|---|---|
| 3,997,976 A | 12/1976 | Li | 33/391 |
| 4,094,073 A | 6/1978 | Parra | 33/366.14 |
| 4,206,400 A | 6/1980 | Holdren et al. | 324/679 |
| 4,339,709 A * | 7/1982 | Brihier | 324/725 |
| 4,345,474 A | 8/1982 | Deval | 73/514.18 |
| 4,370,813 A | 2/1983 | Burniski | 33/291 |
| 4,713,890 A | 12/1987 | Wells et al. | 33/366.25 |
| 4,811,491 A | 3/1989 | Phillips et al. | 33/366.12 |
| 4,811,492 A | 3/1989 | Kakuta et al. | 33/366.25 |
| 4,912,662 A | 3/1990 | Butler et al. | 702/154 |
| 5,083,383 A | 1/1992 | Heger et al. | 33/366.19 |
| 5,159,761 A * | 11/1992 | Cagan et al. | 33/366.14 |
| 5,259,118 A | 11/1993 | Heger | 33/366.27 |
| 5,280,424 A * | 1/1994 | Rony et al. | 700/28 |
| 5,313,713 A | 5/1994 | Heger et al. | 33/366.14 |
| 5,406,713 A | 4/1995 | Oman et al. | 33/366.12 |
| 5,475,372 A | 12/1995 | Burke | 340/690 |
| 5,511,420 A | 4/1996 | Zhao et al. | 73/514.18 |
| 5,541,727 A | 7/1996 | Rando et al. | 356/149 |
| 5,751,683 A | 5/1998 | Kley | 369/126 |
| 5,861,754 A | 1/1999 | Ueno et al. | 324/660 |
| 5,939,633 A | 8/1999 | Judy | 23/514.32 |
| 6,313,912 B1 | 11/2001 | Piske et al. | 356/149 |
| 6,317,011 B1 | 11/2001 | Barnett et al. | 333/24 C |
| 6,381,860 B1 | 5/2002 | Yashiro et al. | 33/366.19 |
| 6,515,489 B2 | 2/2003 | Min et al. | 324/662 |

FOREIGN PATENT DOCUMENTS

| | | |
|---|---|---|
| JP | 08-005373 | 1/1996 |
| JP | 2001-033241 | 2/2001 |

* cited by examiner

*Primary Examiner*—Vincent Q. Nguyen
(74) *Attorney, Agent, or Firm*—Morrison & Foerster LLP

(57) ABSTRACT

A capacitive sensor including a pendulum for electronically determining an indication of angular offset and a capacitive leveling device having such a capacitive sensor for leveling an associated reference surface. The capacitive sensor detects a difference in capacitance of one or more capacitors on the pendulum and its housing, each capacitor having a first electrode movable apart from a second electrode as the housing tilts relative to the pendulum.

23 Claims, 14 Drawing Sheets

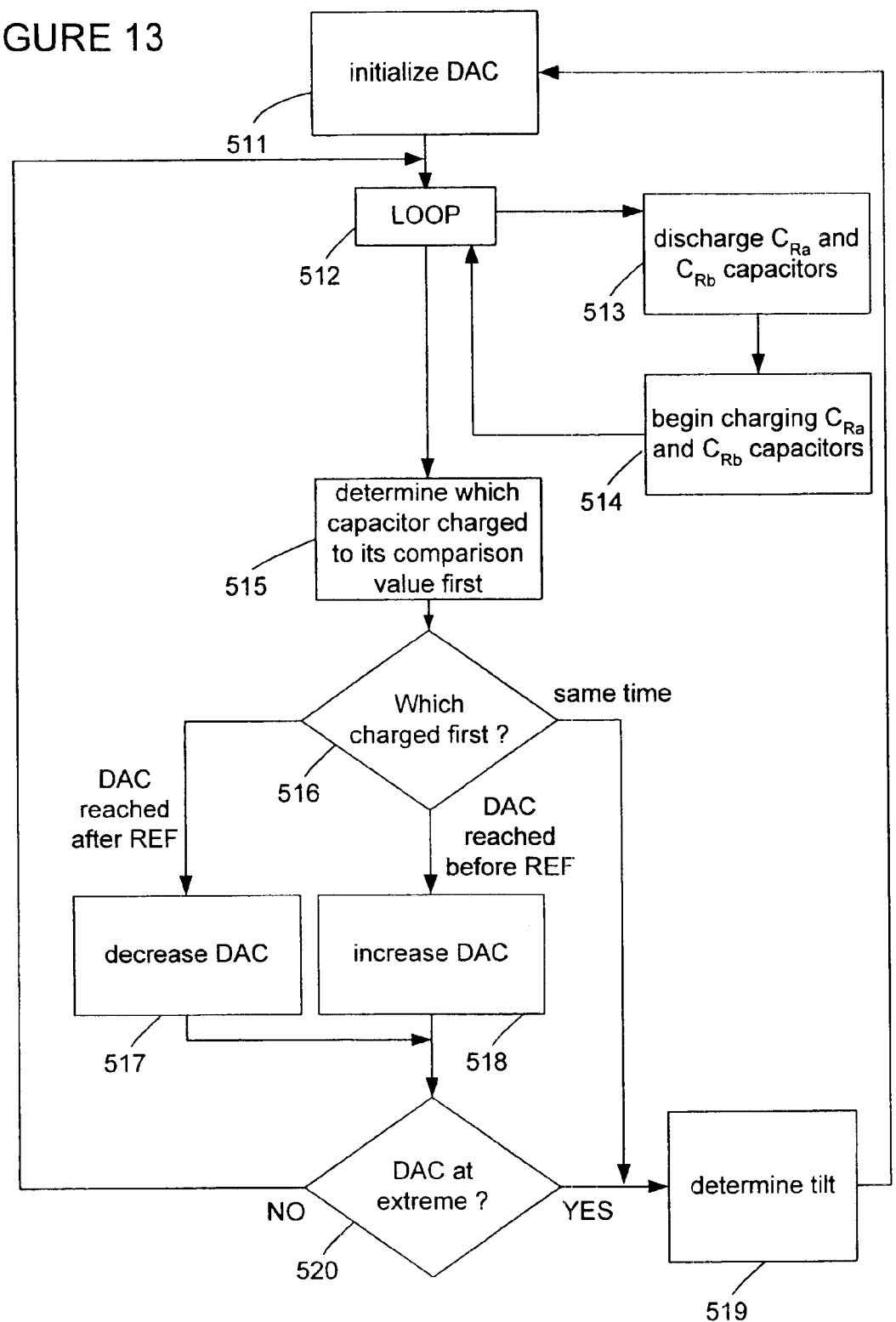

APPARATUS AND METHOD FOR CAPACITIVE LEVEL SENSOR

BACKGROUND OF THE INVENTION

This invention relates to a self-leveling device used, for example, to provide a level surface to support a laser or other light source for construction or other purposes.

Electronic levels for use e.g. in carpentry and construction are well known; examples are shown in U.S. Pat. No. 4,912,662 issued to Butler, et al., U.S. Pat. No. 5,313,713 issued to Charles E. Heger, et al., U.S. Pat. No. 5,083,383 issued to Charles E. Heger, and U.S. Pat. No. 5,259,118 issued to Charles E. Heger, all incorporated by reference. Also, projecting a level line on a vertical surface may be provided by emitting a leveled plane of light from a laser. The laser light may be leveled (relative to the Earth's gravity) by positioning, calibrating and adjusting the laser's orientation. Some levels project a level line by attaching a laser line generator to the shaft of a pendulum. Some levels provide a level line by floating a laser line generator on a liquid. Alternatively, some levels provide a level line by placing a laser light generator on a level surface. These surfaces may be leveled by requiring a user to manually adjust the orientation of the surface until a pair of bubbles (as in a conventional bubble level) is properly aligned. Other levels provide a level surface by using fluid sensors that provide signals to control leveling motors.

However, it has been found by the present inventor that such approaches to provide a level surface to support the laser line generator require costly sensors, demand user interactions or utilize liquids. There is a need for a better automatic electronic sensor for electronic levels.

SUMMARY OF THE INVENTION

A capacitive sensor is provided including a plurality of capacitors, each of the capacitors having a first electrode fixed to a body and a second electrode on a pendulum suspended from the body, wherein a variable distance (capacitance) between the first electrode and second electrode is indicative of a variable angular position of the pendulum. A single conductive surface of the pendulum may form a common second electrode for each of the plurality of capacitors.

A capacitive sensor is also provided including a plurality of variable capacitors and electronic circuitry to determine a relationship among capacitances of the variable capacitors. A capacitive relationship between or among capacitors may be used to determine a direction of tilt or an angle of tilt of a reference surface along one or two axis.

A leveling device is provided to level a surface, the leveling device including a capacitive sensor coupled to one or more mechanical actuators.

The features and advantages of the present invention will become more fully understood from the following detailed description and accompanying drawings.

BRIEF DESCRIPTION OF THE DRAWINGS

FIG. 13 illustrates a method as carried out by a microprocessor to determine a magnitude and a direction to tilt an assembly in accordance with the present invention.

DETAILED DESCRIPTION

Figure 1A:
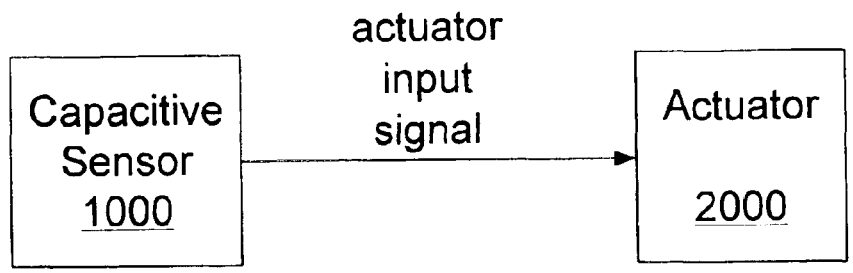
FIGS. 1A and 1B show block diagrams of a capacitive based level in accordance with the present invention.

FIG. 1A shows a block diagram of a capacitive based leveling apparatus, which may be used to level an associated reference surface, in accordance with the present invention. According to some embodiments of the present invention, a capacitive sensor 1000 cooperates with an actuator 2000 to adjust the orientation of the reference surface. The capacitive sensor 1000 includes one or more capacitors with variable capacitances. If the capacitive sensor 1000 senses a change or a difference in a capacitor's capacitance, the capacitive sensor 1000 may generate an actuator input signal.

Figure 1B:
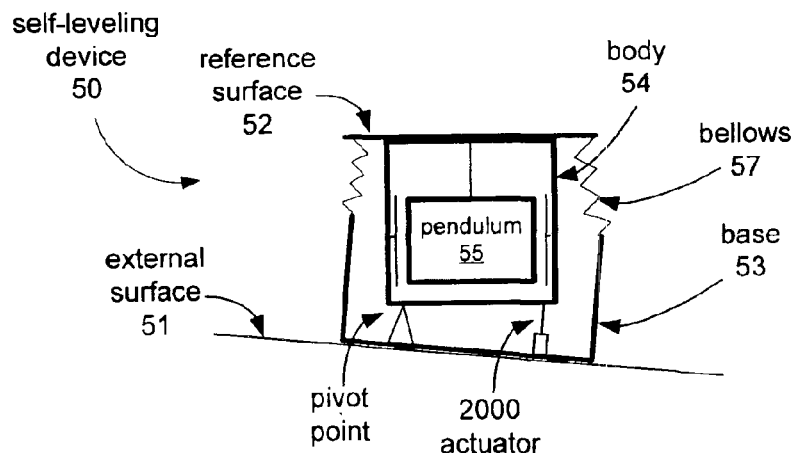

FIG. 1B shows a cross-sectional view of a self-leveling device 50 according to some embodiments of the present invention which includes the FIG. 1A device. The self-leveling device 50 includes a reference surface 52 and a base 53, which rests against the external surface 51. The external surface 51 may be a table, tripod or other support and typically is not level. The self-leveling device 50 also includes a body 54 pivotally coupled to the base 53, a pendulum 55 suspended in the body 54, an actuator 2000, bellows 57, and a pivot point 58. The self-leveling device 50 may rest on a non-level external surface 51 but still provides a level reference surface 52 for a laser source or other precision instrument requiring a level reference plane. The reference surface 52 is fixed to the body 54 such that when the body 54 is moved, the reference surface 52 also moves. The pivot point 58 may be provided by a point connection, as shown, or other pivoting assembly such as a gimbal assembly. The flexible bellows 57 prevent debris from entering and interfering with motion of the actuator 2000 and flexibly couples base 53 to the reference surface 52 and body 54. In operation, the capacitive sensor 1000 (which includes pendulum 55 and body 54) detects a capacitance formed between the body 54 and the pendulum 55. If the capacitance detected indicates that the reference surface 52 is not level, the actuator 2000 lifts or lowers a point of the body 54 until the reference surface 52 becomes level. These may be more than one actuator 2000 provided.

In general, the actuator input signal from sensor 1000 may be used by the actuator 2000 to adjust the associated reference surface to a more level position. The reference surface provides a desired orientation, which may be orthogonal to, or alternatively, in line with, or at some other predetermined offset from the direction of the Earth's gravitational pull. The reference surface thereby provides a reference line or reference plane that may be used to support a light emitting device so as to orient a direction of emission from the light emitting device. The reference surface may define a reference line with two light reference points. Alternatively, the reference surface may define a reference plane with three reference points. Other reference surfaces define a reference plane with a planar surface, which may be made substantially flat by machine tooling.

Actuator 2000 physically adjusts an orientation of the reference surface. Actuator 2000 may include a stepper motor or other motor and a driving mechanism such as a lead screw, jack screw or rack and pinion system. Adjustment of a reference surface 52 to provide a reference line may use a single-axis actuator 2000. Adjustment of a reference 52 surface providing a reference plane may use a dual-axis version of actuator 2000. Each axis may be independently controlled to set an axial orientation of a plane. To orient a reference surface, the actuators may lift or lower the reference surface relative to one or more points of the reference surface.

When an actuator 2000 receives an actuator input signal from a capacitive sensor 1000, the actuator 2000 may rotate or otherwise alter the orientation or relative position of the reference surface towards a predetermined position. The predetermined position of the reference surface may be, for example, a level position orthogonal to the Earth's gravitational pull. In some embodiments, in response to an actuator input signal, a stepper motor activates a rack and pinion system to rotate a reference surface about a pivot point. In some embodiments, a gimbal assembly holds a structure having a body, a reference surface and a pendulum. Two motors, one for each axis, may be used to lift and lower the structure about a pivot point of the gimbal assembly to adjust the relative orientation of the reference surface.

An iterative process may be used to incrementally adjust a reference surface to a predetermined position. With each iteration, the reference surface may move an incremental step closer to the predetermine position. Alternatively, variable sized steps may be used whereby the capacitive sensor 1000 measures a total error offset, then instructs the actuator 2000 to correct for the total measured error. Alternatively, the process may be a continuous process whereby the capacitive sensor 1000 continuously provides an actuator input signal to the actuator 2000 and the actuator 2000 continuously adjusts the reference surface until the reference surface arrives within predetermined tolerances at the predetermined position.

In some embodiments, a capacitive based level may be used to set a reference line towards a predetermined position relative to the gravitational pull of the Earth. In these embodiments, an actuator 2000 may have a single-axis of freedom, thereby only utilizing a single actuator mechanism. In other embodiments, a capacitive based level may be used to set a reference surface towards a predetermined position, rather than just a reference line. In these embodiments, an actuator may have two-axes of freedom, thereby utilizing a dual-actuator mechanism.

Figure 2:
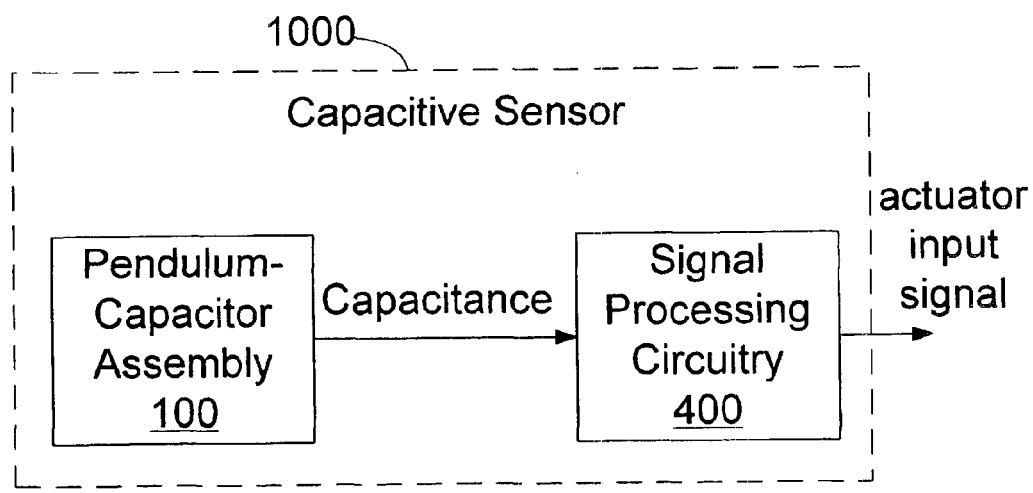
FIG. 2 shows a block diagram of a capacitive sensor in accordance with the present invention.

FIG. 2 shows a block diagram of a capacitive sensor 1000 in accordance with the present invention. The capacitive sensor 1000 includes a pendulum-capacitor assembly 100 and signal processing circuitry 400. The pendulum-capacitor assembly 100 includes one or more conductive body electrodes and a suspended pendulum having one or more conductive pendulum electrodes. A conductive pendulum electrode and a conductive body electrode positioned electrically apart and parallel from the conductive pendulum electrode form a capacitor. The material between the capacitor electrodes may be air or other suitable dielectric material.

Relative movement of the pendulum and body may alter capacitance of a capacitor formed by the pendulum and body electrodes. The signal processing circuitry 400 may sense a capacitance or alternatively may sense a difference in capacitances. The signal processing circuitry 400 then generates and provides an actuator input signal used by the actuator 2000 to level the reference surface.

As is well known, by altering one or more parameters of a two-plate capacitor, the capacitor's capacitance may be changed. For example, capacitance decreases (or increases) by increasing (or decreasing) the distance between the two plates of a capacitor. Capacitance may decreases (or increases) by decreasing (or increasing) the effective plate area. Still, capacitance may decreases (or increases) by decreasing (or increasing) the effective dielectric constant of the material between the plates. The following analysis illustrates the relative effect in changing various parameters of a capacitor.

Capacitance of a capacitor having two parallel plates separated by a dielectric is given by:

$$C = 0.224 * \frac{KA}{d}; \qquad (eq.\ 1)$$

where C is the capacitance expressed in picofarads [pF], K is a unitless measurement of the dielectric constant of the material separating the parallel plates, A is the plate area of one side measured in square inches [in$^2$], and d is the distance that separates the plates measured in inches [in]. One possible dielectric material is air, which by definition has a dielectric constant of K=1. Other dielectric materials include mica (K=2.6 to 3.2), glass silica (K=3.8), glass (K=3.7 to 10) and oil (K=2.1 to 5.3). A typical value for a plate area is A=1 in$^2$. A typical value for plate separation is d=0.05 in. A typical dielectric is air, which has a value of K=1. These typical values result in a capacitor having a capacitance of C=4.48 pF.

To determine what independent parameter (A, d, K) most influences the capacitance of a parallel plate capacitor, one may take and compare a series of partial derivatives with respect to each variable parameter. Comparing the partial derivatives highlights a relative sensitivity of a capacitor's capacitance due to an incremental change of the compared independent variables. A ratio having a large magnitude, e.g., of 20, shows an advantage of varying the capacitive gap rather than the plate area or dielectric constant to sense angular change with a mechanical pendulum.

Figure 3:
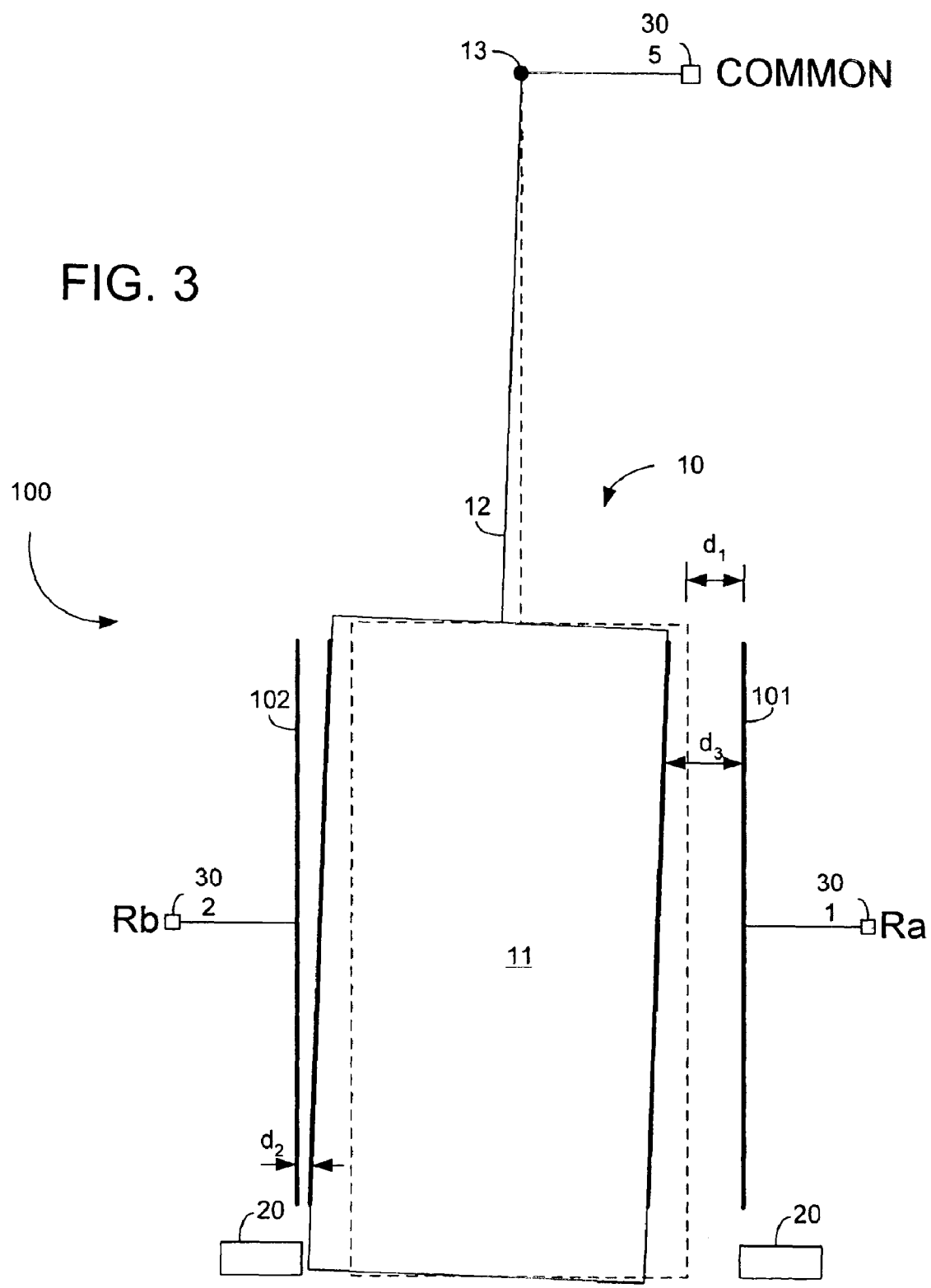
FIG. 3 shows a cross-sectional diagram of a pendulum-capacitor assembly in accordance with the present invention.

FIG. 3 shows a cross-sectional diagram of a pendulum-capacitor assembly 100 of a capacitive sensor 1000 in accordance with the present invention and using the above mechanical pendulum approach to vary the gap. The assembly 100 includes a pendulum 10 having a mass 11 suspended by a suspension material 12 at a pivot point 13. The assembly 100 also includes a pair of conductive body electrodes 101, 102. The conductive body electrodes 101, 102 may have electrical contacts, Ra 301 and Rb 302, respectively. In some embodiments, the assembly 100 also includes one or more stops 20. The stops 20 limit the range of motion in which the pendulum 10 may swing.

In some embodiments, the suspension point 13 for the pendulum 10 and the body electrodes are fixed relative to one another. In some embodiments, the pendulum mass 11 is suspended via a spring 12 having performance characteristics that allow the mass 11 to swing freely while also providing an electrical connection to the mass 11. To prevent electrical shorting of the capacitor electrodes or damage to assemble 100, the stops 20 may be positioned to physically block contact between the pendulum mass 11 and body electrodes 101, 102. In some embodiments, the body electrodes or pendulum electrodes have an insulating coating at areas where the pendulum and body electrodes might otherwise make contact.

In some embodiments, a pendulum 10 swings within the body of the assembly 100 relative to body plates 101, 102. The pendulum 10 comes to rest at a center position (shown with dotted lines) when the assembly 100 is in a static upright position. The distance between a body electrode body 101, 102 and a pendulum 10 plate is shown as do. In an exemplar slightly tilted position, the distance between one body electrode 101 and an electrode of the pendulum 10 has decreased to $d_2$ and the distance between the other body electrode 102 and an electrode of the pendulum 10 has increased to $d_3$. As the distance $d_2$ decreases, the capacitance of the capacitor formed by electrode 102 and the pendulum 10 increases. Similarly, as the distance $d_3$ increases, the capacitance of the capacitor formed by electrode 101 and the pendulum 10 decreases.

FIGS. 4A through 4F show plan views of various capacitive sensors in accordance with the present invention. In some embodiments, a pendulum-capacitor assembly 100 includes one capacitor for each axis of operation and may operate along one axis or two axes. For each axis, a capacitor is positioned to detect a degree of tilt relative to that axis and Earth's gravitational pull. For example, a pendulum-capacitor assembly 100 including one capacitor may be used to align a single axis actuator 2000. The signal processing circuitry 400 senses the capacitance or changes in the capacitance of the single capacitor to generate the actuator input signal. Alternatively, a pendulum-capacitor assembly 100 includes a second capacitor used to align the level along a second axis. The signal processing circuitry 400 generates an actuator input signal for the first axis by sensing the capacitance or changes in the first capacitance and generates a second actuator input signal for the second axis by sensing the capacitance or changes in the second capacitance. For each conductive body electrode, a pendulum mass 11 has a corresponding conductive pendulum electrode. The pendulum mass 11 may be metallic or covered or partially covered with a conductive surface material, which thereby acts as a corresponding conductive pendulum electrode. The pendulum electrodes may be electrically connected to provide a common electrical potential and to form a common electrode of the capacitors.

Figure 4A:
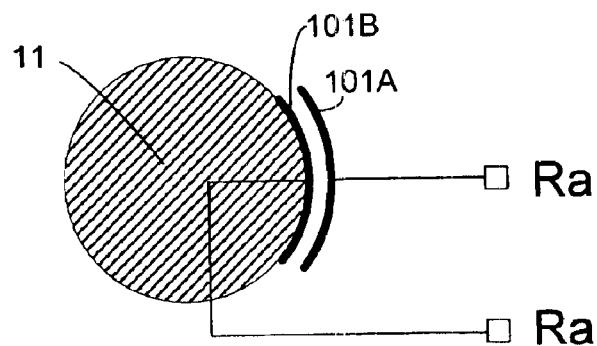
FIGS. 4A through 4F show plan views of various capacitive sensors in accordance with the present invention.

FIG. 4A shows a capacitive sensor with a single capacitor having two electrodes. The first electrode 101A is a conductive surface and may be fixed to a housing or a body of the level. The second electrode 101B is a conductive surface fixed on the pendulum mass 11 and is allowed to swing with the pendulum mass 11. If the capacitor's capacitance is known when the pendulum is upright and square, this capacitance value may be used as a reference capacitance value. When the sensor is tilted, the capacitance changes away from the reference value. By comparing the reference value to the measured capacitance, a tilt may be determined and an actuator input signal may be generated. The electrodes 101A, 101B, as shown here, may be curved in cross-section.

In some embodiments, a pendulum has separate conductive surfaces or subsurfaces. The conductive surfaces are comprised of electrically connected conductive areas or alternatively comprised of electrically isolated pieces of conductive material not directly electrically connected. Alternatively, a pendulum-capacitor assembly 100 includes a pair of capacitors for each axis of operation. Two pairs of capacitors operate along two axes. For each axis, a pair of capacitors is positioned to detect a degree of tilt relative to that axis and Earth's gravitational pull. For example, a pendulum-capacitor assembly 100 including a differential pair of capacitors may be used to align a single axis actuator 2000. The signal processing circuitry 400 generates the actuator input signal by comparing the capacitances of each of the differential pair of capacitors. Similarly, a pendulum-capacitor assembly 100 may include a second differential pair of capacitors used to align the level along a second axis. The signal processing circuitry 400 generates an actuator input signal for the first axis by sensing the capacitances of the first differential pair of capacitors and generates a second actuator input signal for the second axis by sensing the capacitances of the second differential pair of capacitors.

Figure 4B:
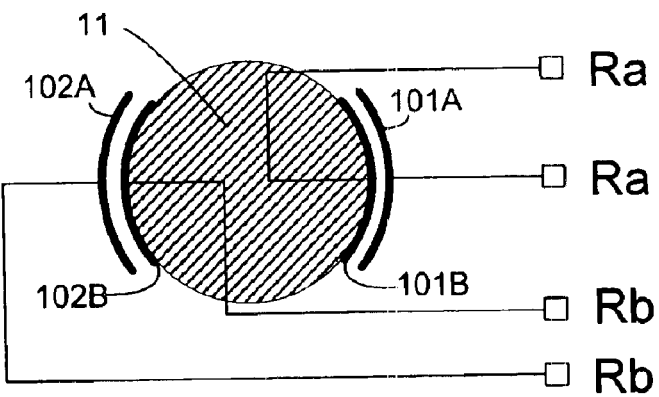

FIG. 4B shows a pair of capacitors at opposing sides of a pendulum mass 11. Each capacitor has a first electrode 101A, 102A fixed on the body of the sensor and a second electrode 101B, 102B fixed on the pendulum mass 11. As the pendulum swings between the first electrodes 101A, 102A, the second electrodes 101B, 102B on the pendulum mass 11 move closer to or farther from its corresponding first electrode 101A, 102A. As the distances change, the capacitances also change. When the pendulum mass 11 is in a center position, the distances between each capacitor's electrode pairs 101A & 101B, 102A & 102B are equal resulting in the pair of capacitors have equal capacitances. When the pendulum mass 11 is closer to a first side, the capacitor on that side will have greater capacitance. The signal processing circuitry 400 may detect an absolute capacitance of each capacitor. Using the absolute capacitances, the circuitry 400 may generate an actuator input signal. Alternatively, circuitry 400 treats the pair of capacitors as a differential pair of capacitors. The circuitry 400 may detect a differential in capacitance between the pair of capacitors, rather than absolute capacitances.

Figure 4C:
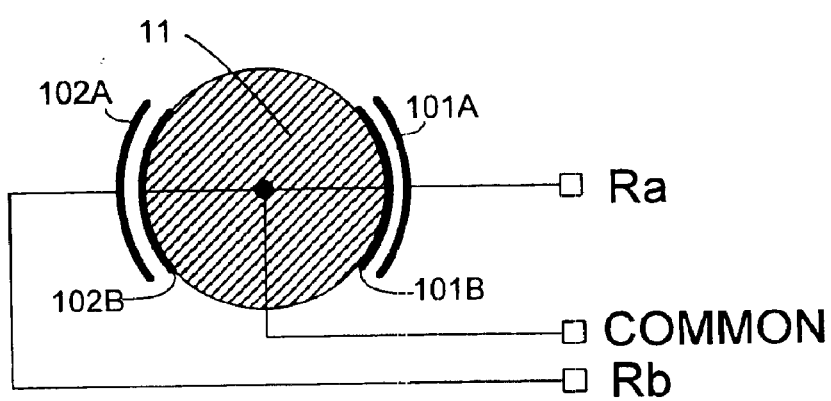

FIG. 4C shows a pair of capacitors at opposing sides of a pendulum mass 11. The first capacitor is comprised of an electrode 101A fixed to the body and a second electrode 100B fixed to the pendulum. The second capacitor is comprised of an electrode 102A fixed to the body and a second electrode 102B fixed to the pendulum. The second electrodes 101A, 102A are shown as electrically connected thereby sharing a common electrode potential. A "common electrode" reduces the number of electrical connections between a pendulum-capacitor assembly 100 and the signal processing circuitry 400.

In some embodiments, groups of capacitors are positioned around a pendulum at angles that are less than 180 degrees. In some embodiments, three capacitors are evenly distributed around a pendulum at 120 degree center spacings. In some embodiments, four capacitors are positioned around a pendulum at 90 degree center spacings. Each capacitor has a body electrode and a pendulum electrode separated by a varying distance. A suspended mass 11 may act as a common electrode shared for all of the pendulum-side electrodes.

Figure 4D:
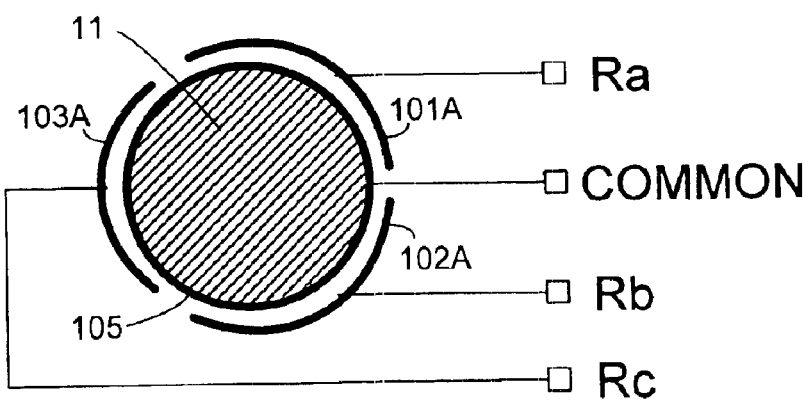

FIG. 4D shows a two-axis capacitor assembly 100. The sensor includes three capacitors positioned at 120 degree center spacings: a first capacitor formed between electrodes 101A and 105; a second capacitor formed between electrodes 102A and 105; and a third capacitor formed between electrodes 103A and 105. To level a surface, tilt along two axes may be measured. Using three capacitors centered approximately 120 degrees apart from one another, the signal processing circuitry 400 compares the relative capacitances of the three or more capacitors to determine a proper actuator input signal to correct the surface's tilt.

Additionally, FIG. 4D shows a pendulum mass 11 having a conductive surface 105. Each of the one or more body electrodes 101A, 102A, 103A has a conductive surface or subsurface. For each of the one or more conductive body electrodes 101A, 102A, 103A, the pendulum has a corresponding conductive area that acts as the pendulum electrode 105. In some embodiments, the pendulum is formed from a material having a conductive surface, which thereby acts as the one or more pendulum electrodes. The conductive surface is used as a common pendulum electrode for each of the capacitors. In this configuration, the capacitors share a common electrode potential.

In some embodiments, capacitors at 180 degree spacings are paired. A first pair of body electrodes along with the common electrode form two capacitors that may be used to detect roll rotation. A second pair of body electrodes along with the common electrode form two capacitors (orthogonal to the first pair) that may be used to detect pitch rotation. With the mass 11 equidistant from either roll body electrodes, the capacitance formed by the common electrode of the mass 11 and each of the roll body electrode will be equal. As the mass 11 changes position relative to the roll electrode, the capacitance from one electrode relative to the mass will increase and while the other capacitance decreases. An equivalent description applies to pitch rotation.

Figure 4E:
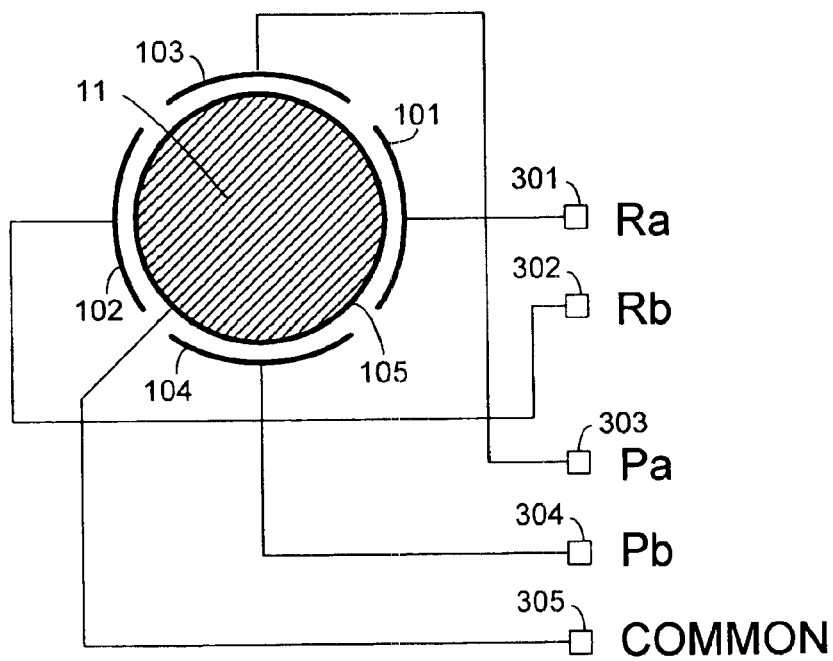
Figure 4F:
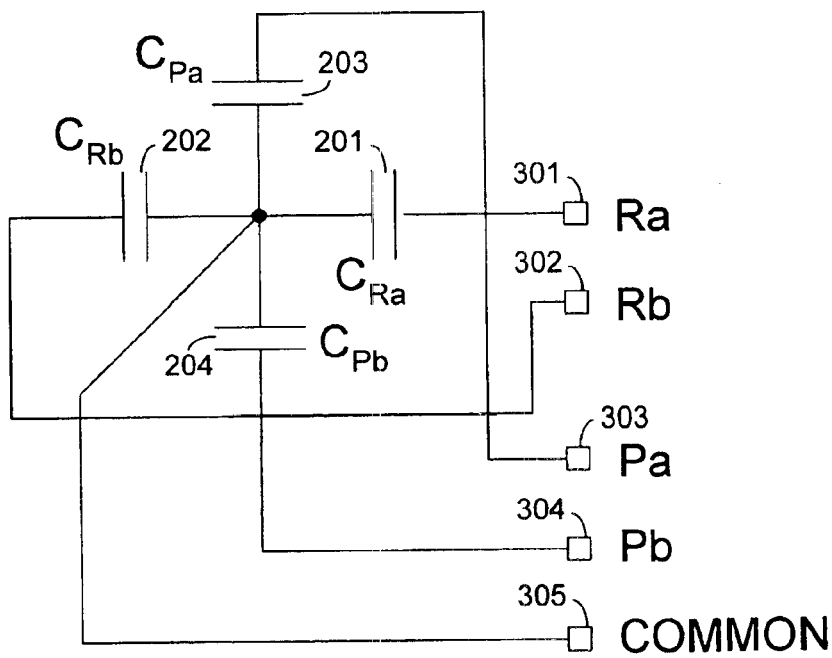

FIGS. 4E and 4F show respectively plan and electrical schematic diagrams of a pendulum-capacitor assembly 100 of a capacitive sensor 1000 in accordance with the present invention. The assembly 100 includes first differential pair of capacitors 201, 202 and second differential pair of capacitors 203, 204 used to align a level along both a first axis and a second axis respectively. The first axis may be roll, while the second axis may be pitch. Body electrodes 101–104 placed around the pendulum mass 11 in conjunction with one shared common electrode 105 define the four capacitors 201–204. The pendulum electrode 105 may have an electrically conductive interface point COMMON 305. The body electrodes 101–104 may be curved or otherwise arced to follow a contour of the pendulum mass 11.

Each of the conductive body electrode 101–104 is nearby a pendulum electrode 105, thereby forming a capacitor. Capacitor $C_{Ra}$ (see FIG. 4F) 201 has a first conductive surface (body electrode 101) and may have an electrical conductive interface Ra 301. Capacitor $C_{Rb}$ 202 has a first conductive surface (body electrode 102) and may have an electrical conductive interface Rb 302. Capacitor $C_{Pa}$ 203 has a first conductive surface (body electrode 103) and may have an electrical conductive interface Pa 303. Capacitor $C_{Pb}$ 204 has a first conductive surface (body electrode 104) and may have an electrical conductive interface Pb 304. A second conductive electrode 105 of the capacitors is provided by a conductive pendulum mass 11.

In some embodiments, two differential pairs of capacitors act to identify positioning of the pendulum 10 relative to the assembly 100. A first differential pair of capacitors (to identify roll) is defined by a first capacitor $C_{Ra}$ 201 and a second capacitor $C_{Rb}$ 202. A second differential pair of capacitors (to identify pitch) is defined by a first capacitor $C_{Pa}$ 203 and a second capacitor $C_{Pb}$ 204. The first differential pair of capacitors may be positioned on opposite sides of the pendulum. The second pair of differential pairs may be positioned orthogonal to the first pair such that one differential pair detects roll and a second differential pair detects pitch.

In some embodiments, each capacitor has an equal capacitance when the assembly 100 is in a perpendicular upright orientation. In an upright orientation, the body electrodes 101–104 rest in line with the Earth's gravitational pull. If the sides of the mass 11 are also in line with the Earth's gravitational pull, there exists a uniform gap between the mass 11 and each body electrodes 101–104. This uniform gap results in equal capacitances for the capacitors. If the assembly is tilted such that it is no longer in line with the Earth's gravitational pull, unequal gaps may result between the mass 11 and body electrodes 101–104. The unequal gaps cause a capacitive differential that may be electronically sensed and used to determine the degree of tilt of two axes.

The assembly 100 may be configured in a variety of ways. In some embodiments, the mass 11 is a cylinder and the body electrodes 101–104 are semi-circular plates as illustrated in FIG. 4E. A cylinder shaped mass 11 does not require any special rotational or vertical alignment with relationship the body electrodes 101–104 during manufacturing. There may be a slight cross-axis coupling, however, between pitch and roll due to the circular geometry.

In some embodiments, the mass 11 is spherical and the body electrodes 101–104 are semi-spherical shaped. A spherical mass 11 does not require rotational alignment but does require vertical alignment. In other embodiments, the mass 11 is block shaped and the body electrodes 101–104 are rectangular shaped plates. With a block mass 11 and flat plate electrodes 101–104, there may be very little cross-axis coupling. Additionally, the block mass 11 does not require horizontal alignment but it must be rotationally aligned with the plate electrodes 101–104 to inhibit yaw rotation. Inhibiting yaw rotation restricts rotational motion about the vertical axis of the mass 11 and provides that each vertical side of the mass 11 remains parallel with a corresponding body plate electrode 101–104.

A linear operational angular range of the assembly 100 is established by weight and dimensions of the mass 11, the dimensions and positioning of the body electrodes 101–104, the axial deflection coefficient of the suspension spring 12, and the range of free motion of the pendulum 10 relative to the body and any stops 20. The axial deflection coefficient of the spring 12 is set by the material, heat treating, wire diameter, spring diameter, overall free length and pitch. In some embodiment, factors are selected to provide a linear range of ±1° in each axis. In other embodiments, a linear range of ±2° of motion is provided for. In still other embodiments, a linear range of ±3° of motion is provided for. Additionally, the assembly 100 may be characterized by its differential capacitance change versus angle of tilt.

Figure 5:
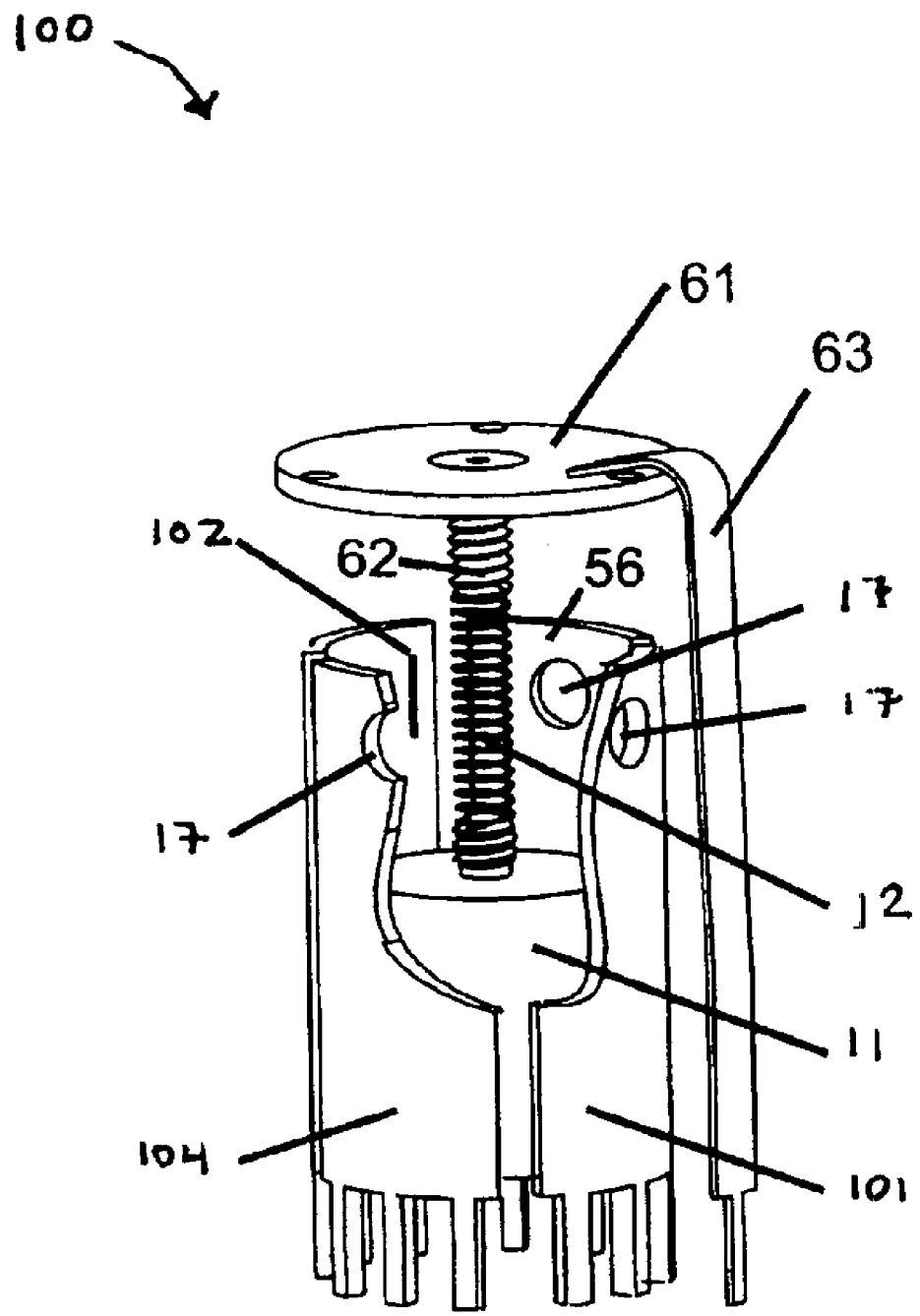
FIGS. 5 through 7 illustrate perspective views of a capacitive sensor in accordance with the present invention.
Figure 6:
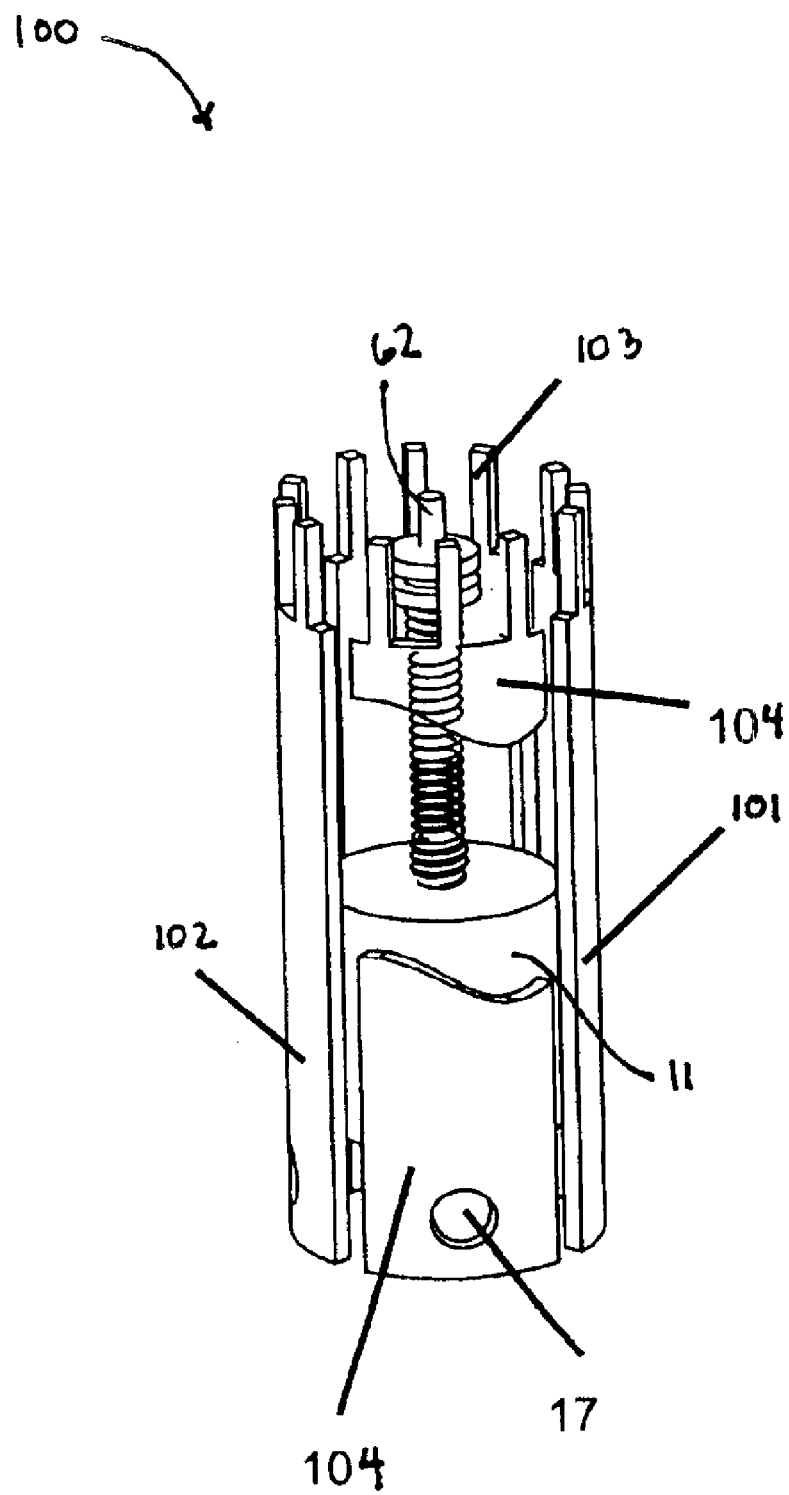
Figure 7:
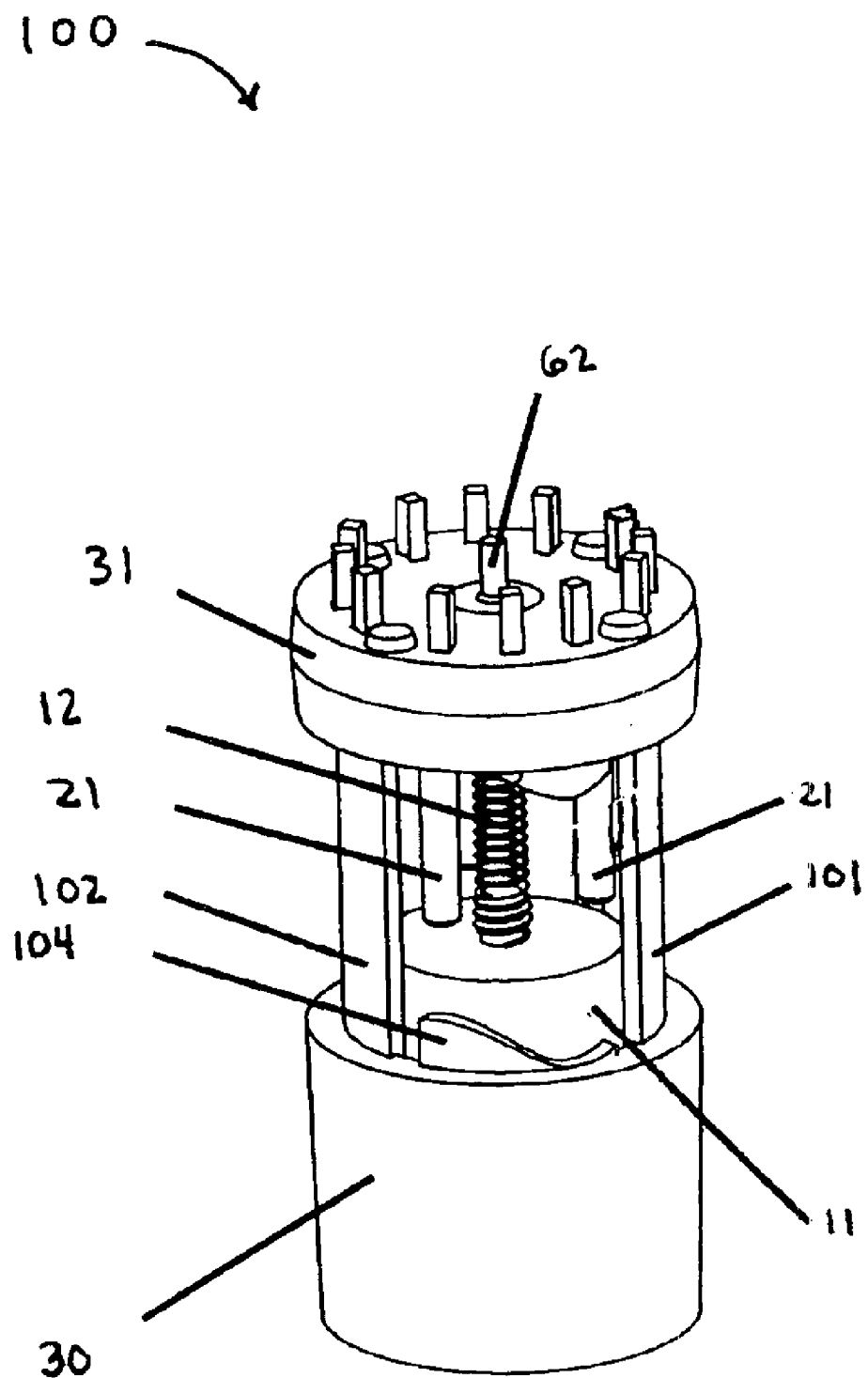

FIGS. 5 through 7 illustrate perspective views of various embodiments of a pendulum-capacitor assembly 100 in accordance with the present invention. In some embodiments, the assembly 100 is mounted to a conventional printed circuit board (PCB) (not shown) containing signal processing circuitry 400. The PCB may be attached to the bottom of the assembly 100. Alternatively, the PCB may be attached to the top of the assembly 100. The electrodes 101–104 may have protrusions or fingers that may be used to mechanically and electrically connect the assembly 100 to the circuitry 400 of the PCB.

FIG. 5 shows a pendulum-capacitor assembly 100 corresponding to FIG. 4E and configured to accept a PCB on the underside of the assembly 100. For clarity, electrodes 101 and 104 are partially cut away and housing material is shown removed to expose the interior of the assembly 100. Four electrodes 101–104 are configured around a conductive pendulum mass 11. Electrodes 101 and 102 along with the pendulum mass 11 comprise a first capacitive differential pair of capacitors. Electrodes 103 and 104 along with the pendulum mass 11 comprise a second capacitive differential pair of capacitors.

A common electrical connection is provided from the pendulum mass 11 to a metallic strap 63. A metallic circular plate 61, containing a threaded metallic stud 62, may be molded into a plastic housing. The stud 62 attaches to a spring 12 with the lower end of the spring 12 attaching to a projecting threaded pin on the top surface of the mass 11. A metallic strap 63 provides electrical connection from the plate 61 to the PCB. An electrical connection is formed along the path of the mass 11, spring 12, stud 62, metallic plate 61, and metallic strap 63. The metallic strap 63 thereby provides a common electrode to signal processing circuitry 400.

The electrodes 101–104 each optionally define an anchor hole 17, which allows plastic housing material to flow into the hole during manufacturing. During injection molding, for example, the anchor holes 17 fill thereby providing a firm mechanical attachment between a plastic housing and the electrodes 101–104.

FIG. 6 shows a pendulum-capacitor assembly 100 configured to accept a PCB on the upper side the assembly 100. Again for clarity, the housing material and a section of electrode 104 are not shown. A metallic stud 62 provides both mechanical support for a spring 12 and a common electrode for the pendulum mass 11 along the spring 12 to signal processing circuitry 400.

FIG. 7 shows a pendulum-capacitor assembly 100, including housing material, configured to accept a PCB on the upper side the assembly 100. Nonconductive housings 30, 31 provide structural support to the four electrodes 101–104. The nonconductive housings 30, 31 may be formed by injection molding of a plastic material. The housings 30, 31 provide rigidity for the assembly 100 while electrically insulating the electrodes 101–104 from each other. The electrodes 101–104 may terminate in pins extending through the plastic housing 31, thereby providing for both mechanical attachment to a PCB and electrical contact to each individual electrode 101–104. The stud 62 may provide a common electrode connection to the PCB.

The assembly may contain stops to limit vertical, horizontal or rotational movement of the pendulum mass 11. Posts 21 protruding down from the upper housing material 31 may thereby be used to limit vertical movement of the pendulum mass 11. For example, three posts 21 may be spaced at 120 degrees apart from each other and may extend down towards the mass 11. A small gap below the lower end of the post 21 and the above upper surface of an at-rest pendulum mass 11 defines a mechanical travel limit in a vertical direction for the mass 11.

Figure 8:
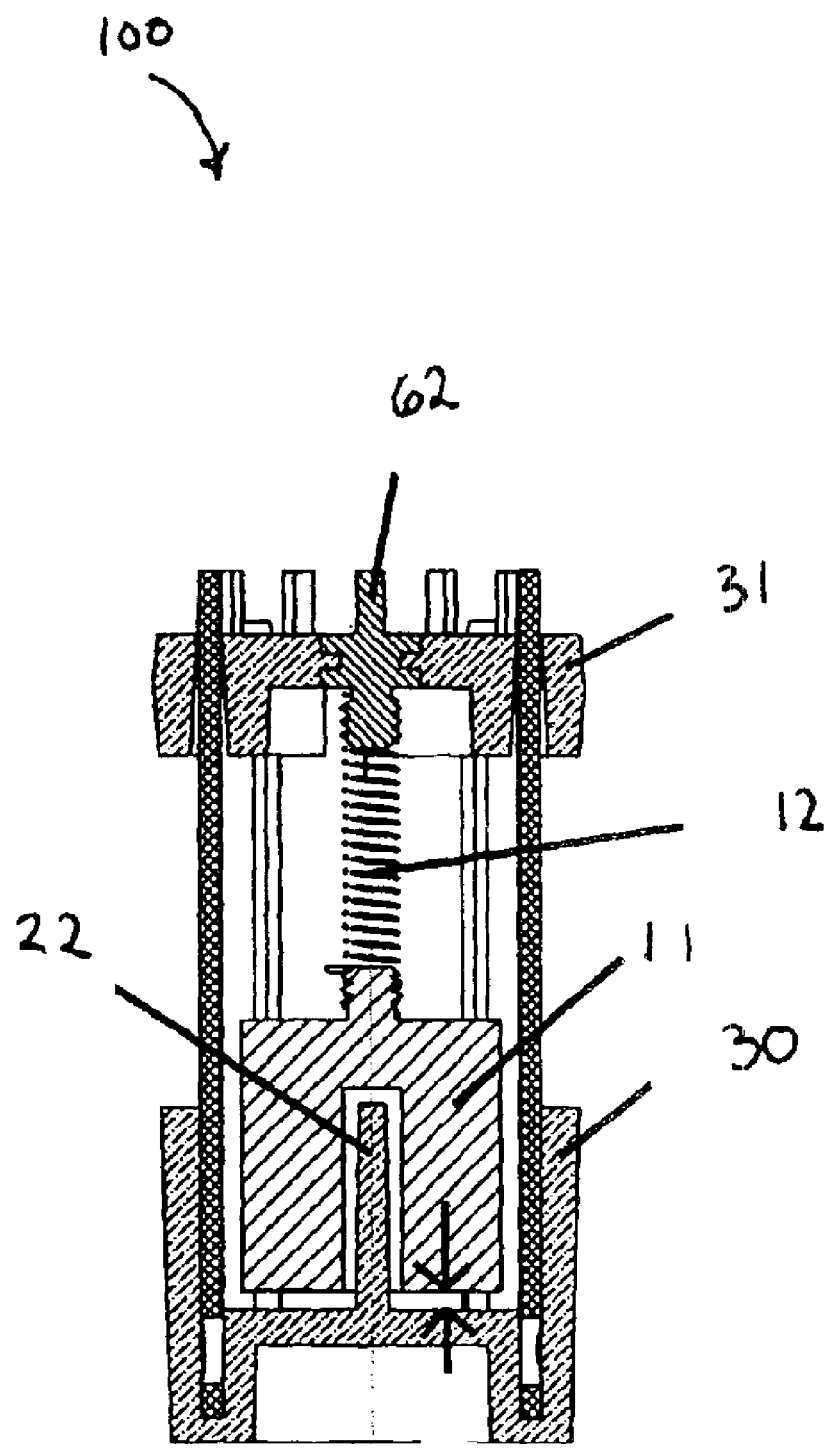
FIG. 8 shows a cross-section through a circular mid-point of a pendulum-capacitor assembly in accordance with the present invention.

FIG. 8 shows a cross-section through a circular mid-point of a pendulum-capacitor assembly 100 in accordance with the present invention. A metal stud 62 of, e.g., FIG. 7, may be molded into a plastic housing 31, thereby providing mechanical rigidity and support. A spring 12 may be threaded onto the stud 62 and the mass 11. A plastic post 22 and a hole in the pendulum mass 11 may be incorporated to provide mechanical travel limits to the mass 11 in both horizontal and downward directions. The plastic post 22, which may be an extension of a lower housing 30, extends vertically into the hole in the pendulum mass 11. The diameter of the post 22 in relation to the diameter of the hole in mass 11 may be set such that the mass 11 is prevented from making physical contact with any of the electrode plates 101–104, thereby limiting the range of motion of the mass 11 in the horizontal direction. Similarly, a vertical distance between the top of the post 22 and end of the hole in the mass 11 may be set to limit the vertical range of motion the mass 11. The post 22 thereby limits motion of the mass 11 within the assembly 100 in both horizontal and vertical directions preventing damage that could otherwise occur as a result of high mechanical shock.

When incorporated as part of the device, signal processing circuitry 400 may be formed on a PCB. The PCB may be mounted under or over the assembly 100, as described above. Alternatively, the PCB may be mounted to the side of the assembly 100 or may be separately mounted.

In some embodiments, signal processing circuitry 400 senses a capacitance or alternatively, a difference in capacitances in the pendulum-capacitor assembly 100. As a result of processing, the signal processing circuitry 400 may generate one or more actuator input signals. To level a surface with respect to two orthogonal axes to a horizontal or near horizontal plane, both roll and pitch changes may be detected and processed by signal processing circuitry 400. Signal processing circuitry 400 may have a combination of shared circuitry and symmetrical circuitry for roll and pitch processing. For simplicity, the following description describes detection and correction by circuitry 400 for roll angular offset. An equivalent description describes detection and correction for pitch angular offset.

Figure 9A:
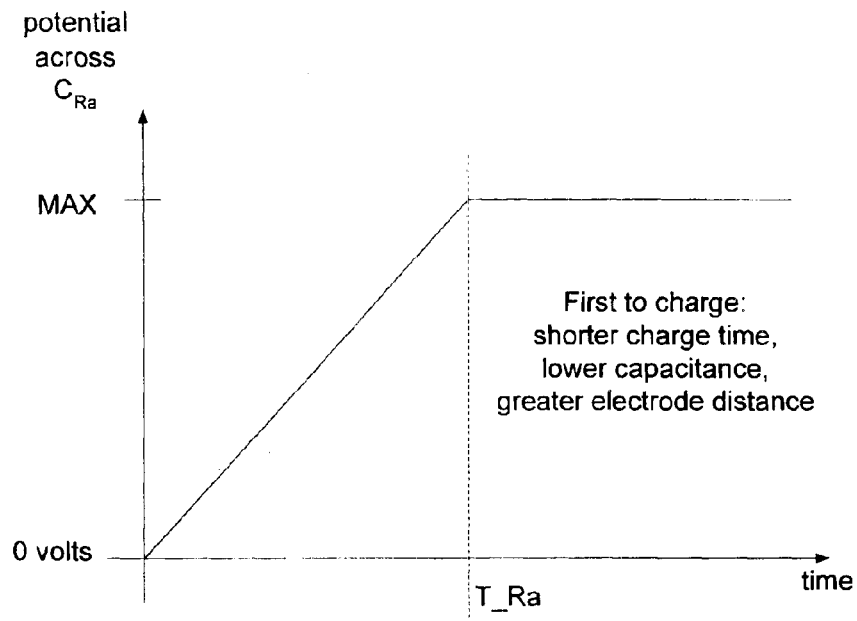
FIGS. 9A and 9B are waveform diagrams that show respective potentials across a differential pair of capacitors.
Figure 9B:
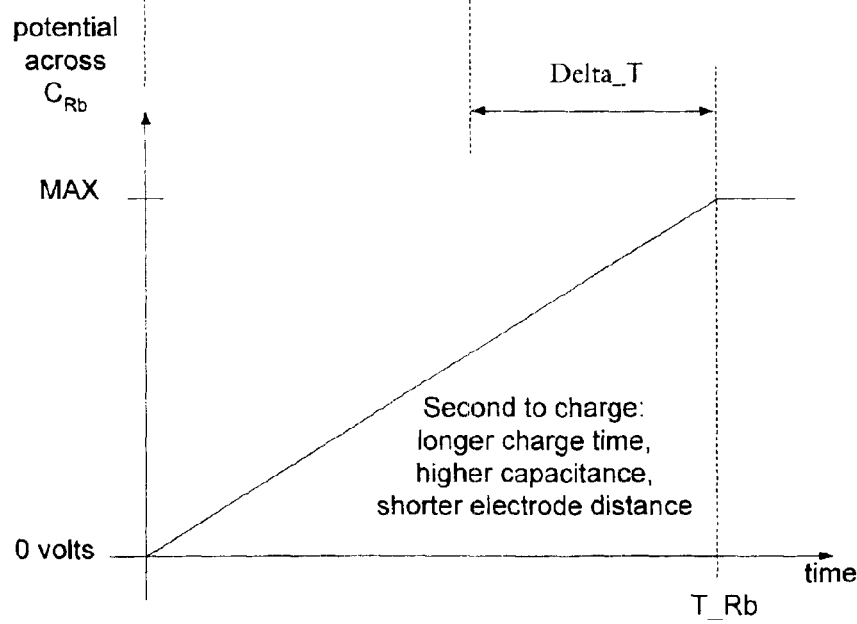

FIGS. 9A and 9B are waveform diagrams that show respective potentials across a differential pair of capacitors $C_{Ra}$ and $C_{Rb}$ as the capacitors charge from a discharged state. In this example, a distance between the pendulum mass 11 and an Ra plate 101 is greater than a distance between the pendulum mass 11 and an Rb plate 102. The greater distances results in capacitor $C_{Ra}$ having a smaller capacitance value than capacitor $C_{Rb}$. Since capacitor $C_{Ra}$ has a smaller capacitance, its resulting charge time, shown as T_Ra, is shorter than the charge time, shown as T_Rb, for capacitor $C_{Rb}$. The difference in charge time may be indicated as Delta_T=T_Rb-T_Ra.

Figure 10:
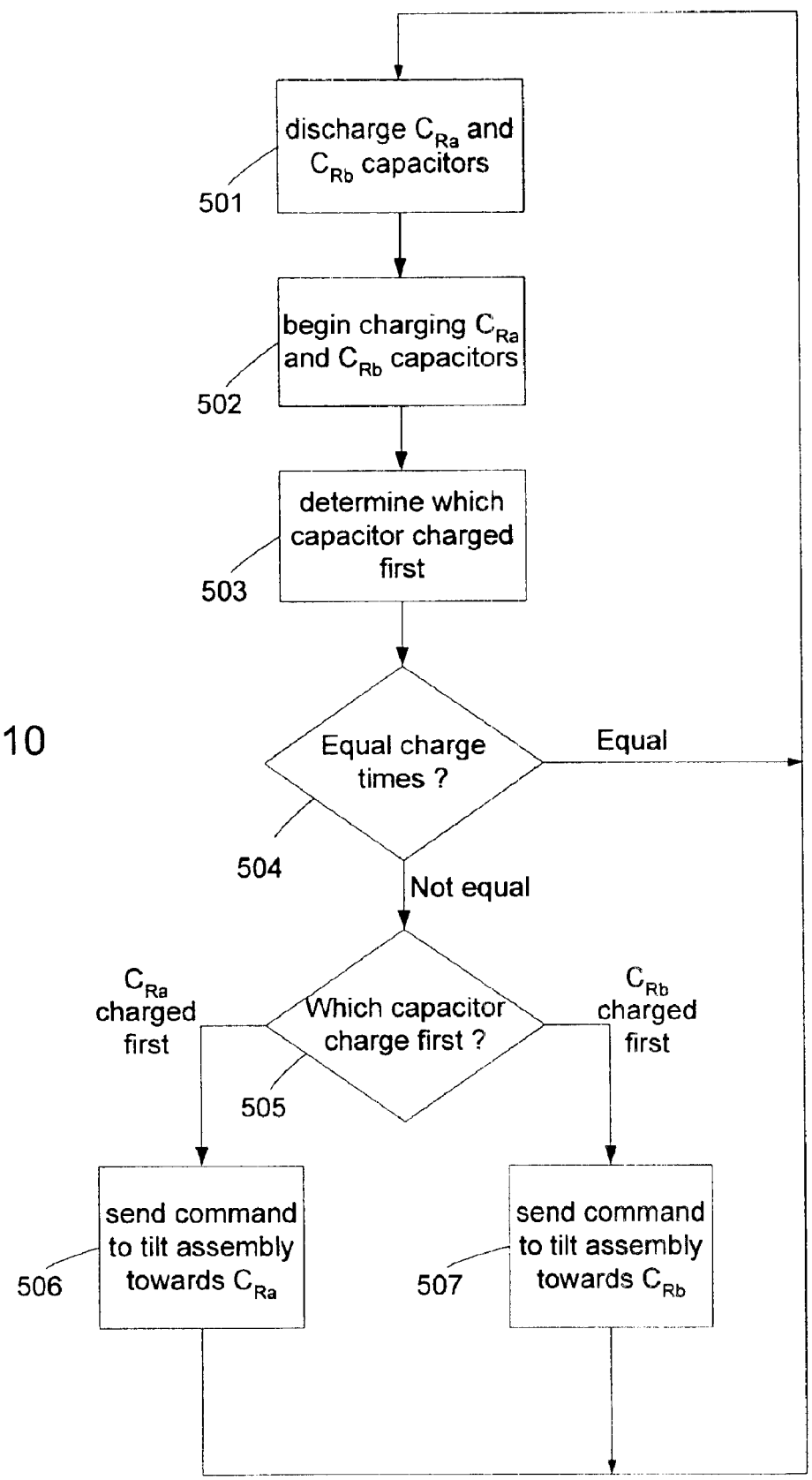
FIG. 10 illustrates in a flow chart a method to determine which direction to tilt an assembly in accordance with the present invention.

FIG. 10 illustrates in a flow chart a method to determine which direction to tilt an assembly 100. In 501, the differential pair of capacitors is discharged such that the potential across each capacitor $C_{Ra}$ and $C_{Rb}$ is zero volts. In 502, charging of the capacitors $C_{Ra}$ and $C_{Rb}$ begins. An equal amount of charge per unit time is provided to each capacitor. A capacitor having a lower capacitance will charge first, which indicates that its electrodes are farther apart. Within a predetermined duration a time, each capacitor charges to a MAX voltage value.

The amount of time for capacitor $C_{Ra}$ to charge is labeled T_Ra. The amount of time for capacitor $C_{Rb}$ to charge is labeled T_Rb. In 503, a determination is made as to which capacitor charged and reached its maximum first. One way to determine which capacitor charged first is to observe the sign of Delta_T, which is the difference between T_Rb and T_Ra. In optional 504, it is determined whether the capacitors charged within a small predetermined duration of time. If so, the pendulum is assumed to be within tolerances of an upright and square orientation. No tilting action is taken. In 505, it is determined which of the two capacitors charged to a value first. If capacitor $C_{Ra}$ charged first, it had a shorter charge time, thus a lower capacitance and a greater electrode distance. As shown in 506, if $C_{Ra}$ charged first, the circuitry 400 may indicate a direction of tilt, which may be used to generate a command to tilt the assembly towards $C_{Ra}$. This action presumably decreases the distance between the capacitor plates of $C_{Ra}$ thereby increasing its capacitance and bringing the assembly 100 to a more upright and level position. On the other hand, if capacitor $C_{Rb}$ charged first it had the shorter charge time, thus a lower capacitance and a greater electrode distance. As shown in 507, if $C_{Rb}$ charged first and $C_{Ra}$ charged second, the circuitry 400 may indicate a direction of tilt, which may be used to generate a command to tilt the assembly towards $C_{Rb}$. This action presumably increases the distance between the capacitor plates of $C_{Ra}$ thereby decreasing its capacitance and brings the assembly 100 to a more upright and level position. The process may be repeated iteratively and indefinitely to incrementally bring the reference surface to a level orientation. Alternately, the process may be repeated for a set duration of time, until a time out occurs, until a user disables the circuitry 400, or until the capacitors fully charge at approximately the same time.

Two differential pairs of capacitors may be included in assembly 100; one pair to detect roll and an orthogonal pair to detect pitch. Signal processing circuitry 400 operable with two differential pairs of capacitors operates as described above with the addition of second similar process. In some embodiments, signal processing circuitry 400 determines a direction, and not a magnitude, in which to rotate about a pitch or roll axis.

Figure 11:
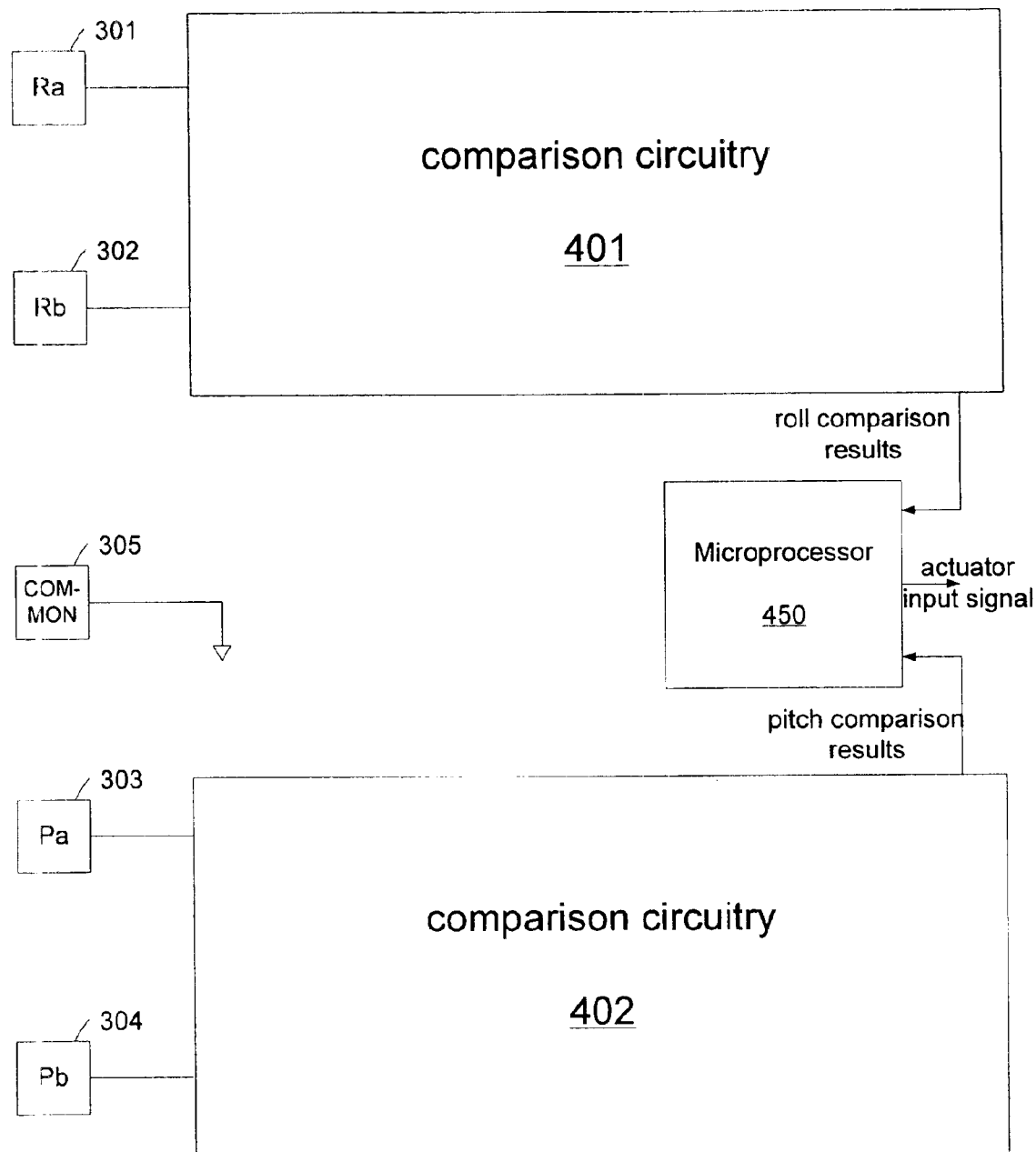
FIG. 11 shows an example embodiment of the signal processing circuitry for processing roll and pitch signals from differential capacitors in accordance with the present invention.

FIG. 11 shows an example embodiment of the signal processing circuitry 400 for processing roll and pitch signals from differential capacitors using the method of FIG. 10. Signal processing circuitry 400 includes comparison circuitry 401 for roll detection, comparison circuitry 402 for pitch detection, and a microprocessor 450 or other control circuitry to monitor the comparison results and issue resulting actuator input signals (Detail of circuitry 401, 402 is shown below). Comparison circuitry 401 may be electrically coupled to a first pair of differential capacitors oriented to detect offsets in roll. Similarly, comparison circuitry 402 may be electrically coupled to a second pair of differential capacitors oriented to detect offsets in pitch.

Comparison circuitry 401 determines whether the capacitor between Ra 301 and COMMON 305 has a greater capacitance than the capacitor between Rb 302 and COMMON 305. Comparison circuitry 401 provides an indication to a microprocessor 450 of the roll offset. The indication may be an indication of a difference in capacitance between the first pair of differential capacitors. Alternatively, the indication may be simply a determination of which capacitance is larger. The microprocessor determines, based on the comparison results, or alternatively based on a series of comparison results taken over a period of time, whether to generate an actuator input signal that instructs the actuator to tilt towards plate Ra or to tilt towards plate Rb.

Similarly, comparison circuitry 402 determines whether a capacitor between Pa 303 and COMMON 305 has a greater capacitance than a capacitor between Pb 304 and COMMON 305. Comparison circuitry 402 provides an indication to a microprocessor 450 of the pitch offset. The indication may be an indication of a difference in capacitance between the second pair of differential capacitors. Alternatively, the indication may be simply a determination of which capacitance is larger. The microprocessor determines, based on the comparison results, or alternatively based on a series of comparison results taken over a period of time, generates an actuator input signal that instructs the actuator to tilt towards plate Pa or to tilt towards plate Pb as in FIG. 10.

In some embodiments, signal processing circuitry 400 determines a difference in capacitance between a pair of differential capacitors thereby determining both a direction and a magnitude to rotate about a pitch or roll axis.

Figure 12A:
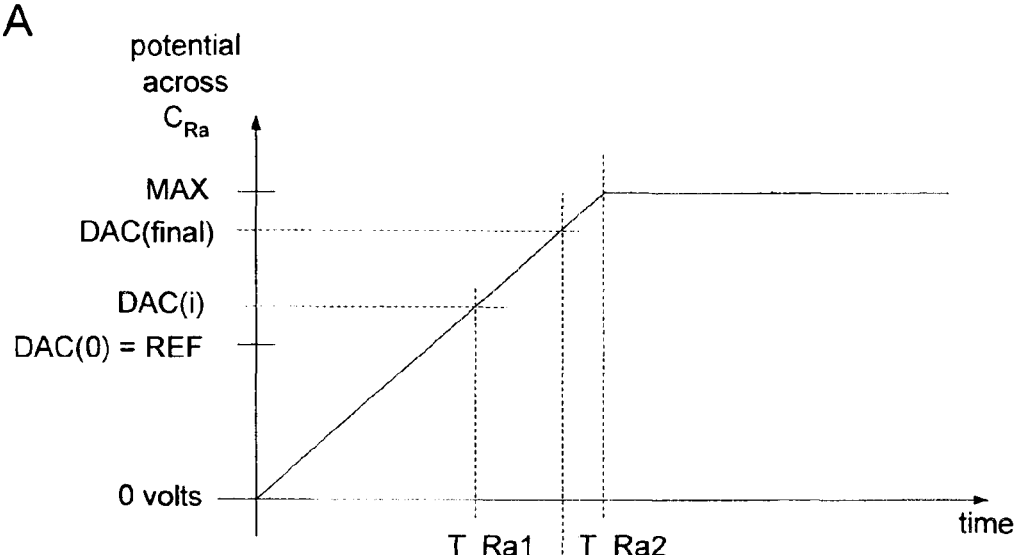
FIGS. 12A and 12B are waveform diagrams that show respective potentials across a differential pair of capacitors in accordance with the present invention.
Figure 12B:
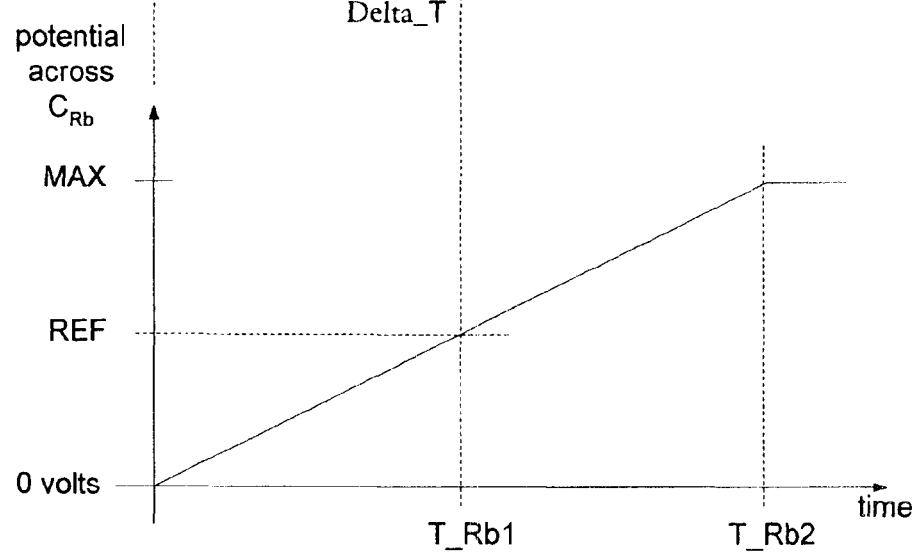

FIGS. 12A and 12B are waveform diagrams that show respective potentials across a differential pair of capacitors $C_{Ra}$ and $C_{Rb}$ as the capacitors charge. In this example, a distance between the pendulum mass 11 and the Ra plate 101 is greater than a distance between the pendulum mass 11 and the Rb plate 102. The greater distances results in the capacitor $C_{Ra}$ having a smaller capacitance value. Since capacitor $C_{Ra}$ has a smaller capacitance, its resulting total charge time, shown as T_Ra2, is shorter than the total charge time, shown as T_Rb2, for the capacitor $C_{Rb}$. FIG. 12A shows a waveform diagram where the potential across $C_{Ra}$ equals DAC(i) at time T_Ra1, and the potential equals MAX at time T_Ra2. DAC(i) is a parameter that may vary with each successive iteration of a process that determines relative capacitances.

FIG. 12B shows a waveform diagram where the potential across $C_{Rb}$ equals a reference voltage REF at time T_Rb1, and the potential equals MAX at time T_Rb2. The voltage reference REF may be set to one-half of MAX. The difference between T_Rb1 and T_Ra1 is shown as Delta_T= T_Rb-T_Ra. An iterative process may be used to adjust the value of DAC(i) in order to drive Delta_T towards zero. DAC(i) may be initialized to an initial value of DAC(0)= REF. After a series of iterations 'i', Delta_T will be approximately zero and the resulting difference between DAC(i) and REF will indicate a relative difference in capacitances between the differential pair of capacitors. Therefore, a final value for DAC(i) may be a voltage value of $C_{Ra}$ at the time the voltage on $C_{Rb}$ passes through a REF level.

FIG. 13 illustrates a method as carried out by the microprocessor 450 to determine a magnitude and a direction to tilt an assembly 100. To determine the relative capacitances of the differential pairs of capacitors, DAC(i) is iteratively adjusted until T_Ra1 substantially coincides with T_Rb1. First in 511, a DAC(i) parameter is initialized. The parameter DAC(i) may be initialized to an initial value of DAC (0)=REF. Alternatively, DAC(i) may be initialized to an initial value stored in non-volatile memory. The value stored in non-volatile memory may be set during factory calibration as a value representing a level position.

In 512, an optional looping to repeat execution of 513 and 514 begins. The looping may result in a discharging and charging cycle to occur a number of times to develop reliable statistics in order to more precisely determine characteristics of the capacitors. Alternatively, only a single execution of 513 and 514 occurs before continuing processing. In 513, the differential pair of capacitors is discharged such that the potential across each capacitor $C_{Ra}$ and $C_{Rb}$ is zero volts. In 514, charging of the capacitors $CR_2$ and $C_{Rb}$ begins. An equal amount of charge per unit time is provided to each capacitor. A capacitor having a lower capacitance will charge first. Within a predetermined duration a time, $C_{Ra}$ will charge above the variable DAC(i) level and $C_{Rb}$ will charge above the constant REF level. For each loop through 513 and 514, a count may be kept to record the number of times one capacitor reached its comparison value before the other capacitor reaches its comparison value. For example, if the loop cycles through 513 and 514 sixty-four times, the number of times that $C_{Ra}$ reached DAC(i) before $C_{Rb}$ reached REF may be counted.

In 515, a determination is made as to which capacitor charged to its comparison value first: $C_{Ra}$ charged above DAC(i) level or $C_{Rb}$ charged above REF. If looping occurred in 512, the count of the number of times one capacitor reached its comparison value first may be compared to the number of iterations occurred by looping. For example, if DAC(i) was reached 58 out of 64 times before REF was reached, then it may be generally concluded that DAC(i) occurs before REF at the present angle of tilt. In some embodiments, if the looping determines that DAC(i) occurs first for at least 75% of the loop iterations, then the DAC(i) is presumed to occur first. If the looping determines that DAC(i) occurred first for less than 25% of the loop iterations, then the DAC(i) is presumed to occur second. If DAC(i) occurred first between 25% and 75%, then it is presumed that the time that $C_{Ra}$ had a voltage value of DAC(i) was the same time that $C_{Rb}$ had a voltage value of REF. Of course other lower and upper thresholds may be used besides the example 25% and 75% described above.

In 516, a choice is made based on which occurred first. If the $C_{Ra}$ reached DAC(i) before $C_{Rb}$ reached REF, then in 517 the next DAC value DAC(i+1) is assigned a value that is decreased from the current DAC value DAC(i). If the $C_{R2}$ reached DAC(i) after $C_{Rb}$ reached REF, then in 518 the next DAC value DAC(i+1) is assigned a value that is increased from the current DAC value DAC(i).

In a case that the DAC values changes, in an optional 520, a determination is made whether next DAC value is an extreme value. An extreme value of the DAC may indicate that the degree of tilt is beyond the bounds of the sensor and that a tilt command is necessary. If the DAC value has not reached an outside boundary, the new DAC value is used again starting with 512. The process continues until DAC(i) is driven to a value that causes $C_{Ra}$ to reach DAC(i) at approximately the same time that $C_{Rb}$ reaches REF.

If in 516 it was determined that $C_{Ra}$ reached DAC(i) at approximately the same time that $C_{Rb}$ reached REF, in 519 an angle of tilt may be determined. When the time difference is approximately zero (Delta T=0), the magnitude of the tilt may be determined by calculating a voltage difference Delta_V=DAC(i)-REF. Each DAC incremental value may be equated to an incremental angle of tilt. The magnitude of Delta_V is indicative of the difference in capacitance between the differential pair of capacitors. The sign of Delta_V indicates the direction to tilt, either towards Ra or Rb. An angular value of the tilt may be provided. In some embodiments, a single indicative of the tilt is used to generate a tilt command, e.g., to electromechanical actuators.

The process may be repeated indefinitely. Alternately, the process may be repeated iteratively until both Delta_T and Delta_V are driven to zero. Once Delta_T and Delta_V are driven within predetermined tolerances of zero, the pendulum is presumed to be within tolerances of an upright and square orientation. No further tilting reporting or action is taken. Alternately, the process may be repeated for a set duration of time, until a time out occurs, or until a user disables the circuitry 400.

Figure 14:
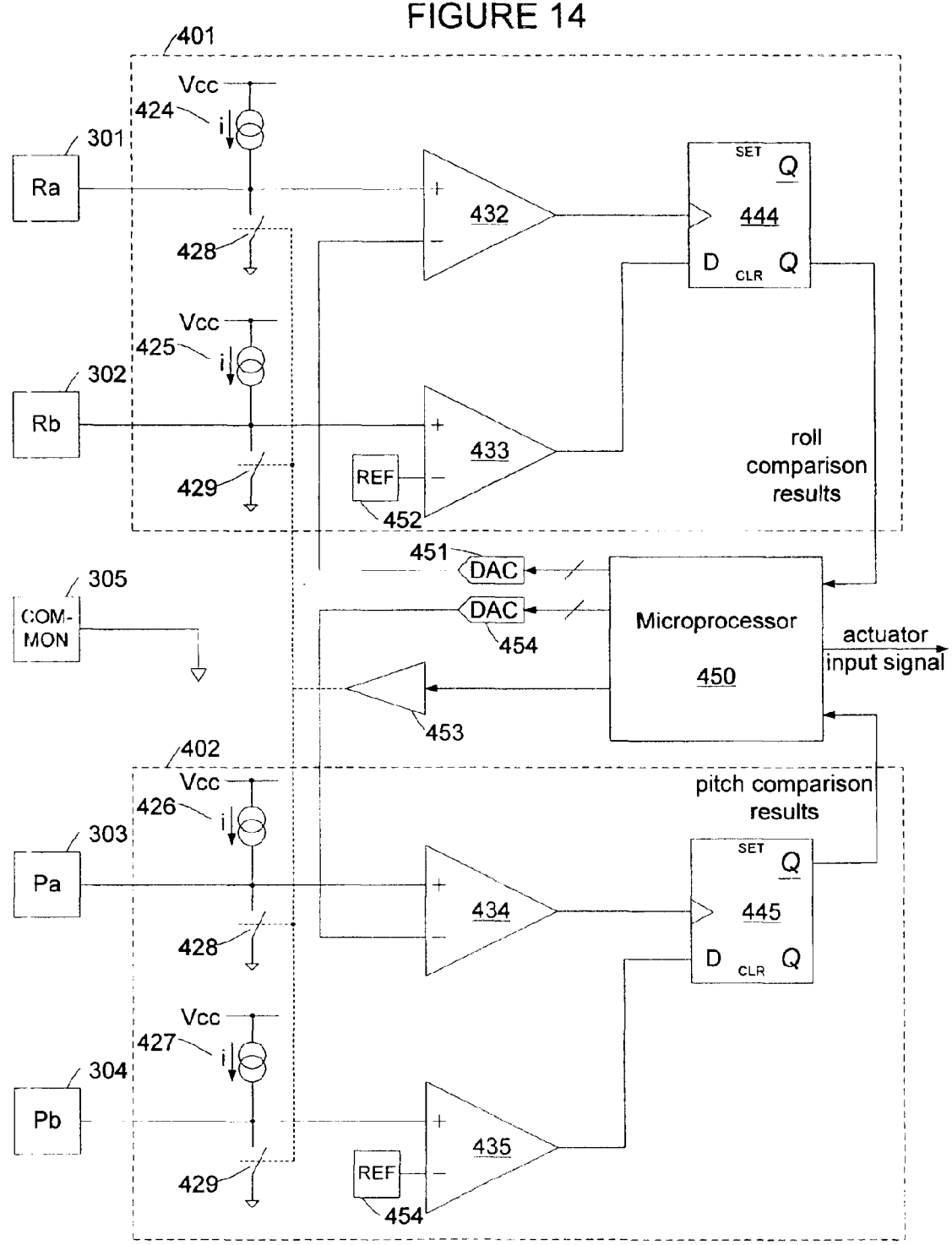
FIG. 14 shows schematically an exemplary embodiment of signal processing circuitry to process roll and pitch differential capacitors in accordance with the present invention.

FIG. 14 shows schematically an exemplary embodiment of the signal processing circuitry 400 to process roll and pitch differential capacitors. Signal processing circuitry 400 includes comparison circuitry 401 for roll detection, comparison circuitry 402 for pitch detection, and a microprocessor 450 or other control circuitry to monitor comparison results and issue actuator input signals. Comparison circuitry 401 may be electrically coupled to a first pair of differential capacitors oriented to detect offsets in roll. Similarly, comparison circuitry 402 may be electrically coupled to a second pair of differential capacitors oriented to detect offsets in pitch.

Comparison circuitry 401 determines the relative capacitances of a capacitor between Ra 301 and COMMON 305 and a capacitor between Rb 302 and COMMON 305. Comparison circuitry 401 provides an indication to a microprocessor 450 of the roll offset. The indication may indicate a difference in capacitance between the first pair of differential capacitors. The microprocessor 450 determines, based on the comparison results, or alternatively based on a series of comparison results taken over a period of time, an angular tilt value. The angular tilt value may be used to generate an actuator input signal that instructs the actuator to tilt towards plate Ra or to tilt towards plate Rb by a calculated angular amount.

Similarly, comparison circuitry 402 determines whether a capacitor between Pa 303 and COMMON 305 has a greater capacitance than a capacitor between Pb 304 and COMMON 305. Comparison circuitry 402 provides an indication to a microprocessor 450 of the pitch offset. The indication may be an indication of a difference in capacitance between the second pair of differential capacitors. The microprocessor determines, based on the comparison results, or alternatively based on a series of comparison results taken over a period of time, an angular tilt value, which may be used to generate an actuator input signal that instructs the actuator to tilt towards plate Pa or to tilt towards plate Pb by a calculated angular amount.

The sensor assembly electrodes 301–304 are each connected to a respective current source 424–427 and to a respective shorting switch 428–431. Alternatively, each of the electrodes 301–304 may be connected to one end of a respective resistor (not shown). The other end of the resistor may be switched between COMMON to discharge the capacitor and Vcc to charge the capacitor. In these embodiments, the discharging time occurs over a longer period of time than the charging time to insure complete discharge of the capacitors before the next charge cycle begins. For example, discharging may occur during $15/16^{ths}$ of a discharge/charge period and the charging may occur during the remaining $1/16^{th}$ of the period.

With all switches 428–431 closed, the voltages of signals 301–304 will be zero. The microcontroller or microprocessor 450 outputs an excitation signal to buffer 453 to open all four switches simultaneously. The current sources 424–427, all identical, begin to charge the capacitive elements of the sensor. The four signal lines 301–304 from the sensor rise linearly with respect to the line's capacitance. Each signal 301–304 drives a first input of a respective comparator 432–435. Comparators 432–435 may be high input impedance comparators, e.g., CMOS comparators.

To determine the degree of roll rotation, a differential capacitive signal pair, such as 301 and 302, drives its respective comparators 432, 433. Comparator 432 has a second input driven by digital-to-analog converter (DAC) generated signal 451. Comparator 433 has a second input tied to voltage reference REF 452.

When the linearly rising voltage at 301 equals the analog output signal from DAC 451, the comparator 432 has an output that changes state. Likewise, when signal 302 equals the voltage reference REF 452, an output of comparator 433 also changes state. The outputs of comparators 432 and 433 drive a clock input and a data input of d-type flip-flop 444, respectively. The flip-flop 444 has a Q output equal to either 1 or 0 depending on whether the data input was a 1 or 0 when the clock input changed state. Thus, the output of flip flop 444 will assume a logic state dependent upon which capacitor charged faster. This logic state is provided to the microprocessor 450 to provide a measure of the direction from level the sensor electrode pair is currently positioned with respect to roll axis.

To determine the degree of pitch rotation, a second electrode pair 303, 304 similarly drive comparators 434, 435. A separate DAC 454 provides a DAC value to comparator 434. Microprocessor 450 may maintain two DAC values, one for roll calculations and a second for pitch calculations. Alternatively, microprocessor 450 may multiplex use of a single DAC. Comparator 435 has a second input coupled to REF 454. REF 454 may be the same potential provide by REF 452. The outputs of the comparators similarly drive a d-type flip-flop 445. The output of flip-flop 445 is provided to the microprocessor 450 to provide an indication of pitch offset.

After sufficient time has passed for all comparators to change state, the microcontroller 450 may change the logic state of the switch signal provided to buffer 453. The changed logic state closes the switches 428–431 thus discharging all four sensor capacitive electrodes to wait for the next charge-discharge cycle.

By adjusting the DAC 451 value up and down and monitoring at which point the Q output changes, a microprocessor 450 may hone in on the DAC 451 value that causes the comparators 432, 433 to change at the same time. This operation of adjusting the DAC value until the Q output changes forms a closed loop feedback system. The final difference between the DAC voltage and the reference voltage REF 452 indicates the angle of the mass in the pendulum with respect to the differential capacitors.

As described above, microprocessor 450 drives two separate DACs 451, 454. One may be dedicated to roll detection and a second may be dedicated to pitch detection. Alternatively, microprocessor 450 may drive a single DAC 451. The microprocessor 450 may use a first series of DAC 451 values to detect and correct for roll offset. The processor 450 may next use a second series of DAC 451 values to detect and correct for pitch offset.

In some embodiments, comparison circuitry 401 processes both roll and pitch offsets. During a first time period, inputs 301 and 302 are switched in and processed with a first series of DAC values to determine roll offset. During a second time period, inputs 303 and 304 are switched in and processed by circuitry 401. By time multiplexing of circuitry 401, both roll and pitch may be processed by a single comparison circuit 401.

While the present invention has been described with reference to one or more particular variations, those skilled in the art will recognize that many changes may be made thereto without departing from the spirit and scope of the present invention. Each of these embodiments and obvious variations thereof are contemplated as falling within the spirit and scope of the claimed invention, which is set forth in the following claims.

What is claimed is:

1. A capacitive sensor comprising:
   a body;
   a pendulum suspended from the body;
   at least one capacitor, wherein each capacitor has a first electrode on the body and a second electrode on the pendulum, whereby a variable capacitance between the first electrode and second electrode is indicative of a relative angular position between the body and the pendulum; and
   a reference surface associated with the body and defining a reference plane having a desired orientation.

2. The capacitive sensor of claim 1, wherein the second electrode of a plurality of the capacitors is a conductive surface of the pendulum.

3. The capacitive sensor of claim 1 there being a plurality of the capacitors and, further comprising circuitry coupled to each of the capacitors which determines a capacitance relationship of the capacitors.

4. The capacitive sensor of claim 3, wherein the capacitance relationship relates a capacitance of a first of the capacitors with a capacitance of a second of the capacitors.

5. The capacitive sensor of claim 3, wherein the capacitance relationship relates a capacitance of a first of the capacitors in a first position of the body with a capacitance of the first of the capacitors in a second position of the body.

6. The capacitive sensor of claim 5, wherein the second position defines a direction orthogonal to the direction of Earth's gravitational pull.

7. The capacitive sensor of claim 1, further comprising circuitry coupled to the capacitor and which generates a signal indicative of a direction of tilt of the body from the pendulum.

8. The capacitive sensor of claim 1, further comprising circuitry coupled to the capacitor and which generates a signal indicative of a degree of tilt between the body and the pendulum.

9. The capacitive sensor of claim 1, wherein:
   there are at least four of the capacitors and the electrodes of the first capacitor are positioned on an opposing side of the pendulum from the electrodes of the second capacitor, and distances between the electrodes of each of the first and second capacitors change with movement of the pendulum in a first vertical plane; and
   the electrodes of the third capacitor are positioned on an opposing side of the pendulum from the electrodes of the fourth capacitor, and distances between the electrodes of each of the third and fourth capacitors change with a movement of the pendulum in a second vertical plane.

10. The capacitive sensor of claim 1, wherein the pendulum comprises:
    a mass; and
    a spring coupling the mass to a pivot of the body.

11. The capacitive sensor of claim 1, there being a plurality of the capacitors and further comprising circuitry coupled to the capacitors and which determines a relationship between capacitances of the capacitors, wherein the relationship is indicative of an angle between an axis of the body and an axis of the pendulum.

12. The capacitive sensor of claim 1, further comprising circuitry coupled to the capacitor and which generates a signal indicative of the relative angular position between the body and the pendulum.

13. The capacitive sensor of claim 1, where the reference surface defines a plane that is orthogonal to the direction of Earth's gravitational pull.

14. The capacitive sensor of claim 13, further comprising at least one actuator mechanically coupled to one of the reference surface or body thereby to orient the reference surface relative to a support surface.

15. The capacitive sensor of claim 1 wherein the pendulum has a conductive area disposed at each of four quadrants; and the body includes:
    a pivot from which the pendulum is suspended;
    a first conductive area facing the first quadrant of the pendulum;
    a second conductive area facing the second quadrant of the pendulum;
    a third conductive area facing the third quadrant of the pendulum; and a fourth conductive area facing the fourth quadrant of the pendulum; the conductive areas on the pendulum and body respectively defining four capacitors.

16. The capacitive sensor of claim 1, further comprising an external laser module detachability coupled to the reference surface.

17. A method of providing a reference plane, comprising the acts of:

providing a body having an associated reference surface defining the reference plane, the body having a first electrode;

suspending a pendulum from the body, the pendulum including a second electrode;

sensing a variable capacitance of a first capacitor including the first and second electrodes; and adjusting an orientation of the reference surface in response to the sensed variable capacitance, the reference plane thereby having a desired orientation.

18. The method of claim 17, further comprising the acts of:

providing a second capacitor having a first electrode associated with the body and a second electrode associated with the pendulum;

sensing a variable capacitance of the second capacitor; and determining a relationship of the variable capacitances.

19. The method of claim 17, further comprising the act of:

determining of a direction of tilt between the reference surface and the pendulum from the sensed volatile capacitance.

20. The method of claim 17, wherein the pendulum further including a mass and a spring, and further comprising the act of coupling the mass to a pivot of the body.

21. The method of claim 17, wherein the act of adjusting the orientation of the reference surface includes adjusting the orientation of the reference surface with respect to the pendulum in response to the sensed variable capacitance.

22. The method of claim 21, further comprising the act of coupling at least one actuator to one of the reference surface or body, the actuator being positioned for orienting the reference surface ref five to the pendulum.

23. The method of claim 17, further comprising the act of detachability coupling an external laser module to the reference surface.

* * * * *